United States Patent [19]

Trett et al.

[11] Patent Number: 4,910,464
[45] Date of Patent: Mar. 20, 1990

[54] PROXIMITY DETECTOR

[75] Inventors: John Trett, Marlow; Peter F. Bradbeer, Slough, both of United Kingdom

[73] Assignee: Formula Systems Limited, Eynsham, United Kingdom

[21] Appl. No.: 216,229

[22] Filed: Jul. 7, 1988

Related U.S. Application Data

[62] Division of Ser. No. 88,109, Aug. 12, 1987.

[30] Foreign Application Priority Data

Nov. 6, 1985 [GB] United Kingdom ............... 8527277

[51] Int. Cl.$^4$ .................. G08B 13/00; H03K 5/22; H03K 5/153
[52] U.S. Cl. ........................... 328/5; 307/358; 250/221; 250/341; 340/552; 367/93
[58] Field of Search .................. 328/5; 377/6, 15; 250/341, 221, 222.1; 356/4; 340/552, 553; 367/93; 307/358, 360, 445, 490, 498, 350

[56] References Cited

U.S. PATENT DOCUMENTS

| | | | |
|---|---|---|---|
| 3,719,938 | 3/1973 | Perlman | 250/221 |
| 3,852,592 | 12/1974 | Scoville et al. | 250/221 |
| 3,961,320 | 6/1976 | Erdmann et al. | 367/93 |
| 4,135,155 | 1/1979 | Kehl et al. | 250/222.1 |
| 4,191,894 | 3/1980 | Noda et al. | 328/5 |
| 4,514,084 | 4/1985 | Makino et al. | 356/4 |
| 4,523,108 | 6/1985 | Niiho et al. | 307/358 |
| 4,565,029 | 1/1986 | Kornbrekke et al. | 250/221 |
| 4,581,526 | 4/1986 | Brattgard | 250/222.1 |
| 4,590,410 | 5/1986 | Jönsson | 250/222.1 |
| 4,691,105 | 9/1987 | Huffnagle | 250/342 |
| 4,719,363 | 1/1988 | Gallacher | 250/221 |
| 4,742,337 | 5/1988 | Haag | 250/221 |
| 4,839,605 | 6/1989 | Trett et al. | 307/358 |

FOREIGN PATENT DOCUMENTS 0084178 5/1984 Japan ................. 250/341

OTHER PUBLICATIONS

J. Millman—"Microelectronics", McGraw-Hill—1979—pp. 570-572.

Primary Examiner—John S. Heyman
Assistant Examiner—Tai V. Duong
Attorney, Agent, or Firm—Christie, Parker & Hale

[57] ABSTRACT

A movable door incorporates a proximity detection system for sensing obstructions in the path of the door. The system comprises an array of transmitter/receiver pairs (21, 22 and 23), each pair comprising a transmitter (1) for transmitting an energy pulse, a receiver (2) located adjacent the transmitter and directed to receive any reflected transmitter pulses, and a shielding (3) for shielding the receiver (2) from receiving energy pulses directly from the transmitter (1). At least two transmitter/receiver pairs (21, 23) are mounted on a leading edge or face of the door (12) to transmit energy pulses in a direction which is not at right angles to the leading surface or edge of the door, to monitor for obstructions in the path of the door (12). Another two transmitter/receiver pairs (26 and 28) are mounted on the leading edge or surface of the door (12) to transmit energy pulses at right angles to the surface or edge of the door (12). Different transmitter/receiver pairs may transmit on different frequencies, and means for suppressing unwanted reflected signals is provided. Means for transmitting data signals on a two-conductor power supply cable for the system is disclosed.

4 Claims, 5 Drawing Sheets

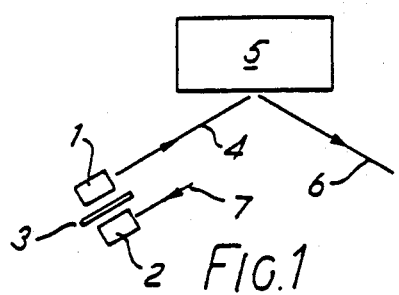
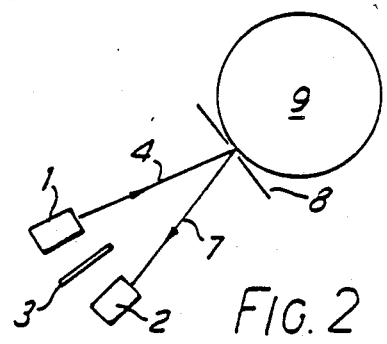
FIG. 1  FIG. 2
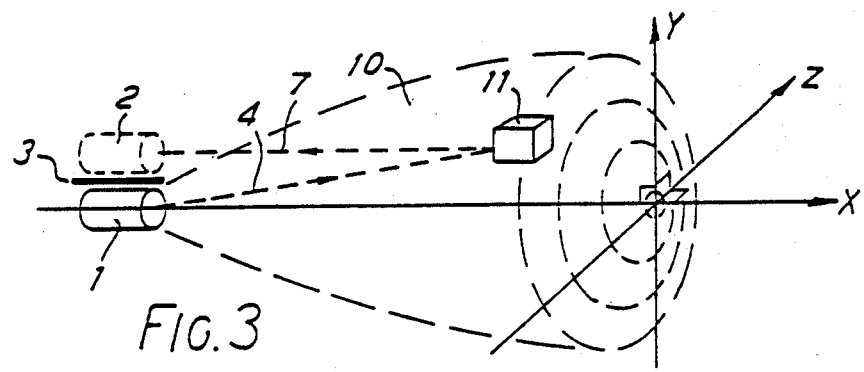
FIG. 3
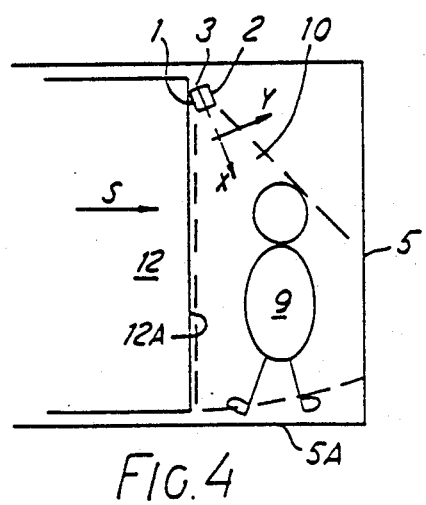
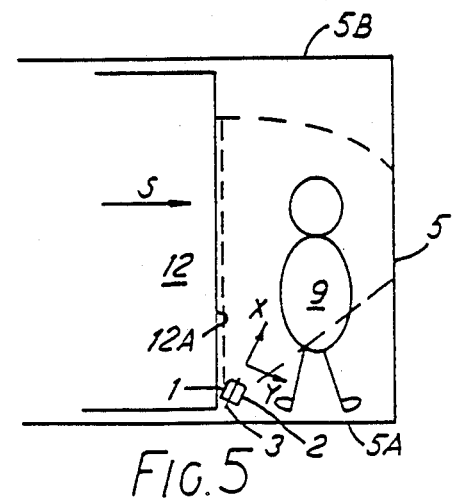
FIG. 4  FIG. 5

PROXIMITY DETECTOR

CROSS-REFERENCE TO RELATED APPLICATIONS

This is a division of application Ser. No. 088,109 filed Aug. 12, 1987.

The invention relates to a proximity detector for the detection of the presence and position of objects and people or parts thereof in the path of moving mechanical devices, such as automatic sliding doors, automatic swing doors or moving vehicles of robots, to, for example, enable corrective safety action to be taken.

It is common practice in the construction of automatic doorways to include means of ensuring that the doors cannot close on a person causing discomfort or injury. A number of contactless systems are known for detecting the presence of a person in a doorway, particularly the presence of a person in the space which the door is approaching. British Patent Specifications 711515, 856985, 1108884, PCT/GB82/00022 and European Patent 0097139 are but a few which describe systems of this nature.

All of them involve positioning a proximity detector on the door, establishing conditions whereby a person can be identified in the space or volume which the door is approaching, but being able to ignore walls and other fixed objects by balance bridge techniques, or by reducing the sensitivity when the door is close to the fixed object.

While this approach works satisfactorily in many instances, it is not always reliable in practice and tends to be prone to false firing under changing site conditions. For example, when very close to fixed objects the slightest variation in door position may cause a balance bridge circuit to give a false detection. If the sensitivity is reduced under these conditions, then 'nulls' often occur where detection is not possible.

This invention provides a means of increasing the sensitivity and range of detection and maintaining and often increasing the sensitivity when the sensor is very close to objects not to be detected, without false firing.

It is preferable with sliding or swing doors to provide types of protection as follows:

(1) For a person very close to the leading edge or side of a closing door, detection is necessary over the full length of the leading edge or side of the door, this detection range must be adequate to prevent a person (hand, foot, etc.) being touched by the door, i.e. to be greater than the stopping distance of the door.

(2) For a person approaching a door, detection is necessary to establish the presence of the person to delay the door closure.

(3) With building sliding doors it is necessary to establish detection of a person approaching a door to open the door.

(4) With a swing door it is necessary to establish separate detection of persons approaching a door from either side to operate a stop circuit to prevent the door from hitting one of the persons.

(5) With a swing door it is necessary to establish detection also outside the path of the door opening to allow timely response.

The invention uses as its basis a method of, and apparatus for, controlling the range and angular vision of a detection unit which is mounted on or near a moving object (e.g. door) for the purpose of providing information as to the position of other objects, stationary or movable, within a specified space or volume. Two types of detection units are discussed, namely reflective acoustic (e.g. sonic or ultrasonic) and electromagnetic.

The invention will now be described, by way of example, with reference to the accompanying diagrammatic drawings, in which:

FIG. 1 shows a sensor or detector unit and an object with a smooth planar surface;

FIG. 2 shows a sensor unit with a curved object;

FIG. 3 shows a sensor unit and its detection profile;

FIG. 4 shows a sliding door with a detection unit on the top of the door;

FIG. 5 shows a sliding door with a detection unit on the bottom of the door;

Figure 6:
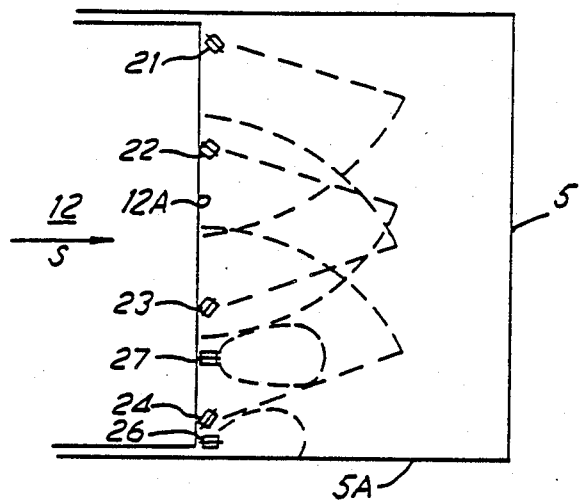
FIG. 6 shows a sliding door with six detection units.

Referring to FIG. 1, a transmitter 1 is sending out energy in the directio 4. Receiver 2 is sensitive to this energy in the direction 7 and will give an electric response thereto. Barrier 3 between the transmitter 1 and the receiver 2 is impermeable to this energy and restricts the direct coupling of the energy between transmitter 1 and receiver 2. In the embodiment shown in FIGS. 1 to 8, the elements 1, 2 and 3 form a single sensor unit. The illustrated object 5 has a reflective surface. It is assumed that the energy signal in direction 4 obeys laws similar to the laws governing the reflection of light and so bounces in direction 6 away from the receiver 2.

Similarly in FIG. 2 there will be a return energy signal from the object 9 in the direction 7 towards the receiver 2 if the point of reflection lies on a tangent 8 with equal angles of incidence and reflection. Using these principles, a system may be constructed to differentiate between smooth and textured surfaces. In the case of a textured surface which is made up of a multitude of curved surfaces some will be in such an orientation as to cause reflection of energy in the direction 7 towards the receiver 2.

Referring to FIG. 3 the said transmitters or receivers may be transducers of acoustic or electromagnetic energy (for example in the infrared region of the spectrum). These transducers can be manufactured in such a way that they exhibit maximum radiant intensity (transmitters) or maximum sensitivity (receivers) in the direction of the K axis. The intensity or sensitivity of the transducers will fall off in proportion to the angle of their deviation from the X axis. It follows therefore that these transducers may be considered to radiate (transmitters) or receive (receivers) energy in the form of a conical profile 10. A textured object 11 will cause reflection of many signals in the direction 4 from the trasmitter 1 into the receiver 2 (signals in the direction 7). The size of the receiver signals will be proportional to:

(1) Surface area of the object 11 within the conical detection area 10.

(2) Reflective constant of the surface of the object 11 (texture, colour, reflectivity, etc.).

(3) The total distance travelled by the signals.

(4) The distance of the object 11 from the X axis in the direction of Y and/or Z axes.

The receiver 2 could be connected to a measuring device (not shown) which gives a response (detection) only when a preset threshold level is exceeded. The threshold may be such that the object 11 only gives a response with the conical profile 10. Within this conical profile, detection will occur. By arrangement of the attitude of the transmitter 1, barrier 3 and receiver 2 with respect to each other and to the objects to be detected and objects to be ignored, it is possible to control the space or volume in which detection occurs.

Referring to FIG. 4, a sensor unit 1-3 is mounted at the top of an automatic sliding door 12. The door 12 slides in the direction S. The barrier 3 is between the transmitter 1 and the receiver 2 and restricts the direct signal path. The axis X is tilted away from the vertical so as to produce a detection profile 10 which extends from the door edge 12A into the opening. It is preferable that no signal may be emitted from the transmitter in such a direction as to cause reflection from the edge 5 back towards the receiver 2.

The edge 5 is assumed to be a relatively smooth surface and as such will not return any significant signal to the receiver 2 from the transmitter 1. The object 9, situated within the detection profile 10, possesses textured surfaces and offer points some of which reflect signals from the transmitter 1 to the receiver 2 (FIG. 2).

As the door 12 moves in the direction S and gets very close to the edge 5, the signals transmitted from the transmitter 1 are reflected back and forth between the leading edge 12A of the door 12 and the edge 5 thereby increasing the density of the transmitted and returned signals. This has the advantage of increasing sensitivity to small objects (e.g. fingers) when the door is nearly closed.

The range along the axis X of the sensor unit has to be accurately controlled to prevent the floor 5A from being detected and yet allow for detection of objects on the floor (e.g. feet). This application is therefore most suitable for acoustic transmitters/receivers using the relatively slow speed of sound. When using acoustic transducers range can be controlled on a "time till received" basis. In addition, time slots 'blanks' can be incorporated in the circuit to ignore signals from protruding objects, e.g. door knobs and frames. This will be disclosed in more detail in connection with FIGS. 15 and 16 described hereinafter.

FIG. 5 shows an alternative arrangement with the sensor unit 1-3 mounted at the bottom of the leading edge 12A of the door 12. The arrangement is otherwise the same as that in FIG. 1 and the same principles of detection apply. Here the range along the X axis is no longer critical provided that the ceiling 53 is higher than the detection height of the object 9. However, the detection range in the direction S rapidly diminishes towards the floor 5A.

For more critical applications an arrangement of sensors may be used. FIG. 6 shows a possible arrangement of four sensor units 21-24 mounted along the door edge 12A of which units 21 and 22 face downwards and units 23 and 24 face upwards. Each sensor unit comprises a transmitter, a barrier and a receiver as in the previous examples. The angle of detection in the Y and Z axes (FIG. 3) has to be increased to give the same range from the door edge 12A in the direction S as in FIG. 5. However, the detection range in the X axis is no longer critical due to the overlapping of the detection profiles. Therefore instead of the acoustic units used in the previous examples other, e.g. infrared or microwave, units may be used. Other arrangements of units may be used to provide the required detection profile.

The detection profile still diminishes towards the floor 5A, so that it is still difficult to detect an object near the floor. This can be easily overcome by using two additional units 26 and 27. Both these units are looking forward i.e. with their X axes in the direction S. The sensor unit 26 positioned at the floor level will detect objects at the floor level. The sensor unit 27 may have a profile along its X axis greater than the sensor unit 26 but within the profile of the sensor unit 24, and is used solely to disable the sensor unit 26 when the door is close to the edge 5 to prevent detection of the edge.

FIG. 3 shows the plan view of a sensor unit 1-3 mounted on the side A of a swing door 12 near its pivot point 16. The detection profile in the X axis (FIG. 3) is horizontally across the door opening and tilted away from the door 12 so as to produce a detection profile 10A which extends from the door on the side A into the opening area. It is assumed that a wall 35 (or other barrier extending perpendicular to the door when in its normally closed position) has a relatively smooth surface and will not reflect a signal from the transmitter 1 to the receiver 2 when the door is open. As the door 12 comes to close proximity with the wall 35, the signals transmitted from the transmitter 1 are reflected back and forth between the door 12 and the wall 35 giving an increased density of transmission and increased detection sensitivity to small objects. As with single sensor unit arrangements on sliding doors (FIG. 4) the range along the axis X of the unit has to be accurately controlled. This application is therefore most suitable for acoustic implementation (see for example FIGS. 12 and 13). Signals reflected from the door jam 13 may be used to calibrate the overall time slot range 17 to allow for automatic site setting to different door widths and to provide immunity to atmospheric and environmental changes. Further, the signal reflected from the door jam 13 may be used to provide its own time slot blank 14 thus avoiding detection of the face of the door jam 13. Further time slot blanks may be inserted as requested. A similar sensor pair 15 may exist on the other side B of the door 12. This arrangement gives detection on both sides of the door in detection areas 10A and 10B to allow the doot to be controlled appropriately.

Figure 7:
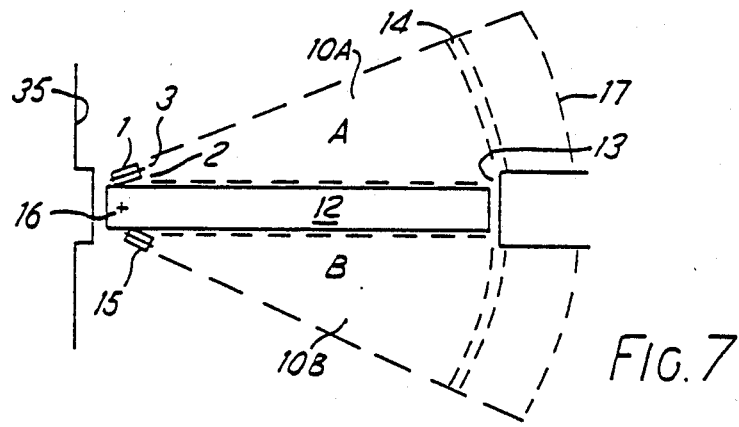
FIG. 7 shows a plan of a swing door with two detection units.
Figure 8:
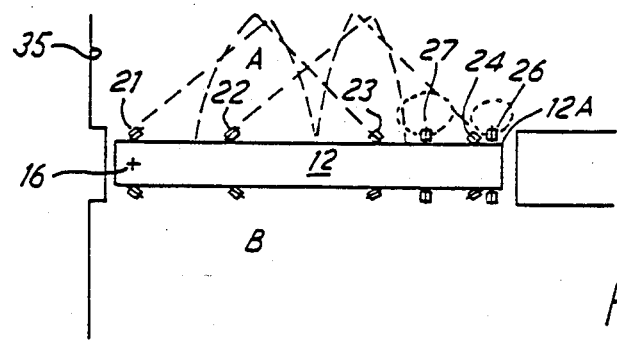
FIG. 8 shows a plan of a swing door with twelve detection units.

FIG. 8 shows the plan view of a sensor unit arrangement 21-27 mounted along the face of a swing door 12. The X axes of the units 21 and 22 face at an angle to the door away from the pivot point 16, and the X axes of the units 23 and 24 face at an angle to the door towards the pivot point 16. The detection profile in the Y and Z axes has to be increased to give the same range in the area A as before (FIG. 7). More care is needed with the detection profiles of units 23 and 24 to prevent reflection from the wall 25 as the door swings about the point 16 towards the wall 35. The X axis of the detector 26 faces away from the door 12 along a tangent to the arc of the door. The unit 27 may face in the same direction as the unit 26 with its detection profile greater than that of the unit 26 but within that of the unit 24. The signal from the unit 26 serves to compensate for the diminished range of detection of the unit 24 near the leading edge 12A of the door 12. The unit 27 disables the unit 26 when the door 12 is close to the wall 35 to prevent detection thereof. More or less units may be needed in the arrangement to provide the required detection profile. A similar sensor unit arrangement may exist on the other side 3 of the door 12 to give detection on both sides of the door.

The principles related are extendable to transmitters and receivers which are situated not next to each other but on different moving or stationary surfaces. As long as the transmitter signals have no direct line of sight to the receiver and the transmitter signals cannot bounce off fixed or moving objects which are not to be detected, e.g. doors, wall or roof, into the receiver to produce sufficient signal to swamp signals bounced off objects to be detected, then the transmitters and receivers and barriers can be positioned anywhere.

Figure 9:
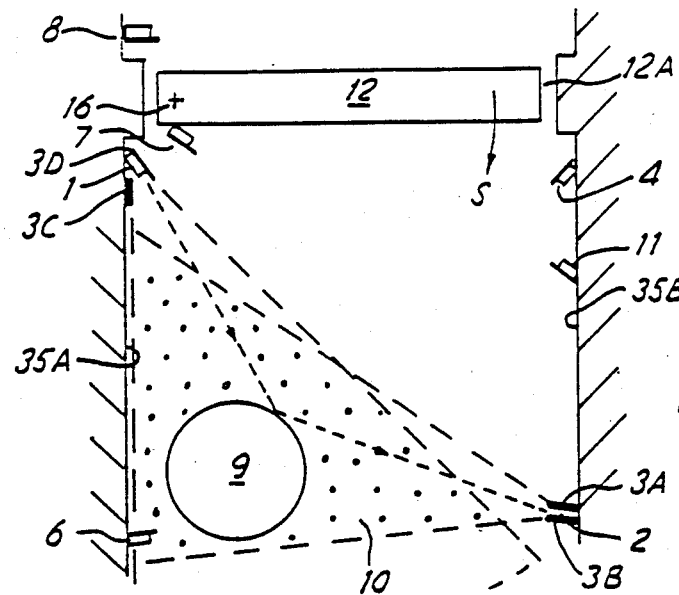
FIG. 9 shows a plan of a swing door and various arrangements of detection units.

FIG. 9 shows but a few possible arrangements. In one of them the transmitter 1 is mounted remotely from the receiver 2. The barriers 3A and 3B at the receiver 2 define a conical detection profile while the barriers 3C and 3D at the transmitter 1 define a conical transmission profile. The intersection of these two conical profiles defines a detection space 10 within which detection of reflective objects will occur. As is apparent from FIG. 9, there is no direct line of sight between the transmitter 1 and receiver 2. It will be understood that by suitable screening or focusing the transmitted and detected energy can acquire any desired profile and thereby the shape of the detection space or volume produced by their intersection can be defined at will. It will be further understood that the stile or walls 35A and 35B can be used for said screening. Object 9, anywhere within the detection space 10 will cause reflection of the signals from the transmitter 1 into the receiver 2. As the door 12 opens in the direction S into the detection space 10 it will itself cause a moving shutter effect by virtue of its impermeability to the energy used, leaving a desirable (albeit reduced) detection space or volume extending at all times from the region of the leading edge 12A of the door 12. In prior art designs this has been the most desirable yet most difficult area in which to provide detection.

Any other transmitter-receiver-barrier combinations may be arranged using this design to cover any space, e.g. transmitter 1 in combination with receiver 6 to cover a space nearer the closed door, and/or transmitter 1 with receiver 7 covering the whole region between the door 12 and wall or stile 35A, and/or transmitter 8 with receiver 11 to cover the region of the leading edge 12A on the other side of the door when the door is open.

Figure 10A:
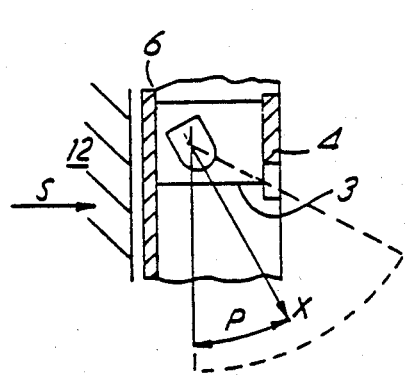
FIG. 10A shows a section through a detection unit along line W—W in FIG. 10B.
Figure 10B:
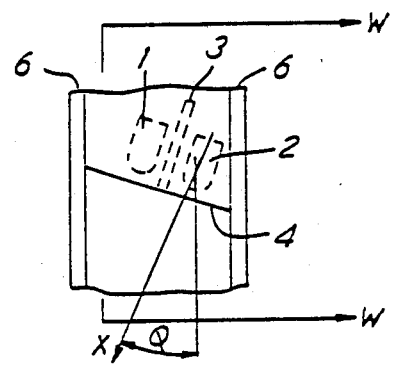
FIG. 10B shows a front elevation of a detection unit in a position in which it is mounted on the leading edge of a sliding door.
Figure 10C:
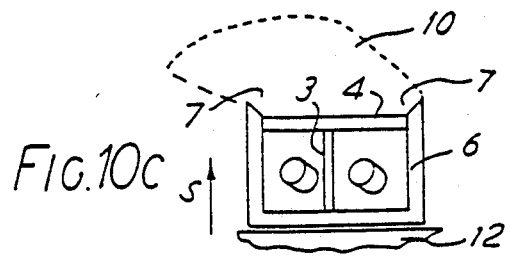
FIG. 10C shows a plan to FIG. 10B.

FIGS. 10A, 10B and 10C show a method of shuttering an infrared sensor unit (transmitter 1 and receiver 2) on the leading edge of the sliding door 12 of an elevator car to give the desired detection profile (space) in the Y and Z axes. The shuttering is achieved by the barriers 3, 4 and 6. The barrier 6 is a channel which restricts the Z axis profile, the barrier 4 restricts the Y axis profile to prevent forward vision in the direction S, and the barrier 3 restricts the direct coupling of signals between the transmitter 1 and the receiver 2. The shuttering uniformly modifies the detection profile of the units so that tolerances (the variation between optical and mechanical axes of the units which gives the inherent profile of individual transmitters and the receivers within the units) are no longer critical.

The sensor unit is tilted away from the leading edge of the door 12 by an angle P to give the direction desired for the X axis (see FIG. 4). The sensor unit may also be tilted at an angle Q to give the desired direction of the X axis away from the lift car towards the landing.

If the wall being approached has a diffused or textured surface, it may be desirable to colour it with a matt-block finish to prevent nuisance detection. The inside of the channel 6 is preferably matt-black to prevent internal reflections corrupting the desird profile. This is also desirable for a pair of centre-opening doors in which the detectors, mounted on the leading edges of both doors, come face to face.

The outside lip 7 of the channel 6 is angled and made reflective. Thus, when the door is very close to the surface being approached, reflections will bounce back and forth between the lips 7 and that surface, thereby increasing the density of transmission and therefore the sensitivity to small objects (e.g. fingers) is further increased.

Figure 11:
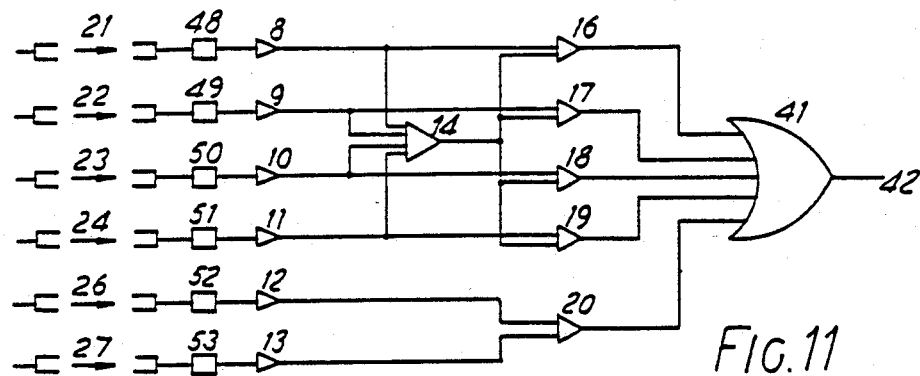
FIG. 11 shows a circuit diagram.

FIG. 11 shows a circuit which may be used with infrared detectors shown in FIG. 6. Known circuit techniques can be used to implement it. Each of the sensor units 21 to 27 is connected to its own non-linear amplifier 8 to 13 through a respective rectifier and smoothing filter 18 to 53. Outputs of amplifiers 8 to 11 are connected to a summing amplifier 14, the output of which is connected to one input of each of four comparators 16 to 19. The other input of each comparator 16–19 is connected to one output of the respective one of the amplifiers 8 to 11. The outputs of the amplifiers 12 and 13 are connected to two separate inputs of the comparator 20. The output of all the comparators 16 to 20 are conncted to the inputs of the logical "OR" gate 41. The output signal 42 from the gate 41 is the detection signal indicative of the presence of a detected object.

In the sensor units 21, 22, 23 24, 26 and 27 the six infrared transmitters may be time-division multiplexed or modulated at the different frequencies so that the six receivers have means to distinguish their respective transmitter signals. Each receiver signal may be amplified using its own non-linear amplifiers 8 to 13 with roll off in gain with increasing signal. This technique increases the dynamic range of the circuit and will prevent saturation of the amplifier when strong signals are being received but maintains the sensitivity to detected objects substantially constant.

Figure 12:
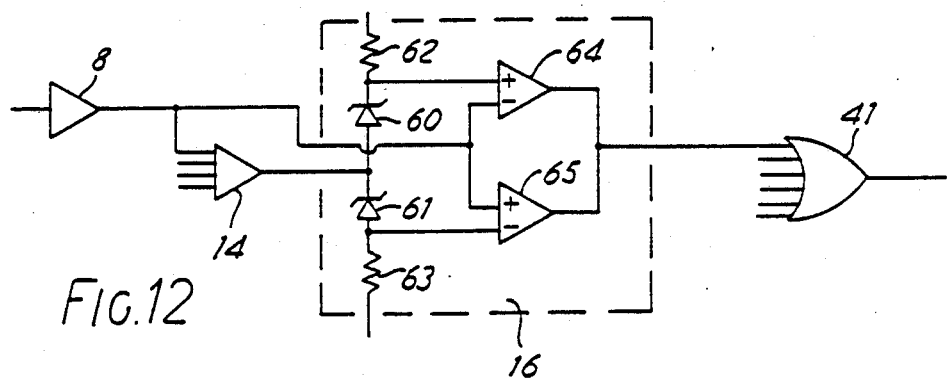
FIG. 12 is a circuit diagram of one of the comparators shown in the diagram of FIG. 11.

The output signal of the summing amplifier 14 represents the average level of the four input signals from the amplifiers 8 to 11. This average signal is used as the reference level for one input to each of the comparators 16 to 19. The other inputs to the comparators are derived from the output signals from the amplifiers 8 to 11. The respective comparators give an output if their received signal goes above or below a threshold band established from and centred on the reference level from amplifier 14. The comparator outputs are processed in the OR gate 41 to give a detection output signal 42. FIG. 12 shows the comparator 16 in more detail.

The comparator 16 comprises a pair of zener diodes 60 and 61 connected in series with respective resistors 62 and 63 to define the desired threshold band. A pair of comparator units 64 and 65 each have one input connected to receive a signal from amplifier 8. The other input of the comparator unit 64 is connected to the junction between the resistor 62 and the zener diode 60 and the other input of the comparator unit 65 is connected to the junction between the zener diode 61 and the resistor 63. The output of the summing amplifier 14 is connected to the junction between the two zener diodes 60 and 61. The outputs of the comparator units 65 and 64 are connected in common to a respective input of the OR gate 41.

If a small reflecting object increases the signal received by the receiver of the unit 21 by a specified amount above that received by the remaining receivers, it will be detected as a signal from amplifier 8 above the upper limit of the threshold band and the comparator 16 will give an output. Conversely, if a large reflecting object increases the signal by a specified amount to receivers of the units 22, 23 and 24, the comparator 16 will still give an output signal as the signal from the amplifier 8 is now below the lower limit of the threshold band established from the now increased average signal from the amplifier 14. In other words, any contrasting surfaces are detected.

In practice the wall being approached may not be a perfect reflector and will cause small signals to be received on receivers of the units 21 to 24 when the door is very close. The circuit of FIG. 11 however will not give an output 42 as all signals from the amplifiers 8 to 11 increase equally and therefore the signal output from amplifier 14 correspondingly increases.

The average signal from the amplifier 14 may be used manually or automatically to reset the outputs of amplifiers 8 to 11 to equality at will and during initial setting. This average signal from the amplifier 14 may also be used during operation to adjust the outputs from the amplifiers 8 to 11 if there is a large, or rapidly increasing error signal or a continuous comparator signal output from the comparators 16 to 19.

Detector units 26 and 27 form the floor circuit (FIG. 6).

Unit 26 is at the floor and unit 27 in the main detection area. The gain from the amplifier 12 receiving signals from the unit 26 is less than the gain from the amplifier 13 receiv9ing signals from the unit 27. If the signal from amplifier 12 exceeds the signal from the amplifier 13, then the comparator 20 gives a detection signal. This is fed to the OR gate 41 to give an output signal 42.

Figure 15:
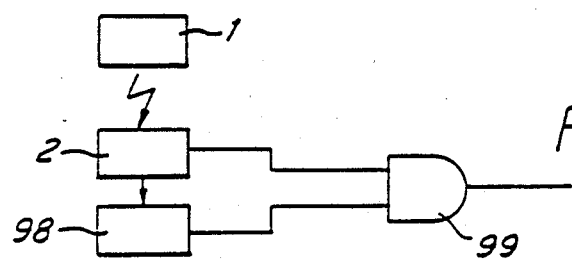
FIG. 15 is a circuit diagram of a blanking circuit.
Figure 16:
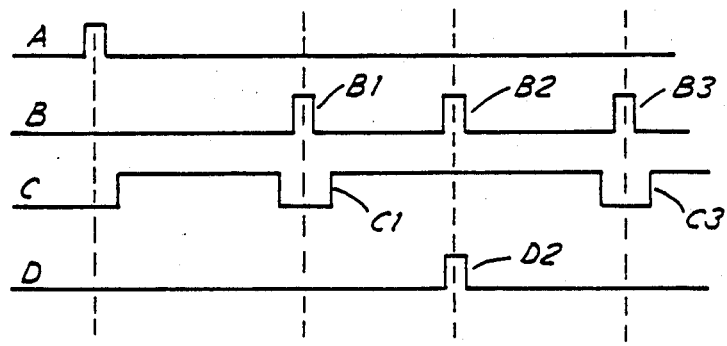
FIG. 16 is a pulse diagram for the circuit of FIG. 15.

In an arrangement using acoustic sensors, in order to avoid the sensors detecting fixed objects such as the floor or a door knob, the blanking circuit shown in FIG. 15 can be used. As shown in the pulse diagranm of FIG. 16 and under steady state conditions, the transmitter 1 transmits a pulse signal A which is then reflected by the door knob and the floor to provide pulses $B_1$ and $B_3$ in the received signal B. These signals if sustained will be memorised by a reference unit 98, which will then generate blanking pulses $C_1$ and $C_3$ in synchronism therewith. The outputs of the reference unit 98 and the receiver 2 are fed to respective inputs of an AND gate 99. In operation the pulses $B_1$ and $B_3$ received by the receiver will coincide with the blanking pulses $C_1$ and $C_3$ and so no output D will occur from the AND gate 99.

When an object to be detected is sensed by the receiver 2, a pulse $B_2$ will be generated. Because this is a transient pulse, it will not have been stored in the memory of the reference circuit 98. As a consequence no corresponding blanking pulse will have been gathered and so an output $D_2$ will appear at the output of the AND gate 99.

In this way stationary objects reflecting energy to the receiver will generally be automatically ignored and only transient objects will be detected.

With unmodulated infrared units it is preferable to synchronise transmission to the mains supply frequency to eliminate potential problems with modulated lighting (e.g. fluorescent or incandescent lights) and periodic mains switching (e.g. from triac controllers nearby). The synchronisation should be performed outside the zero voltage crossing point, as triacs etc., often switch close to zero voltage. If this feature is required, the synchronisation signal derived from the mains supply needs to be made available at the unit on the moving door. Further a two wire power path and a single wire return detection signal path are required for the unit. Other known types of sensor units (e.g. capacitive) may also require different control signals at the sensor units. Prior art systems and these signals separately via a multicore cable which is susceptible to fatigue and breakage. It is preferable to use a minimum of conductors in the flexible cable leading to the moving door to alleviate this problem and to reduce the specification and cost. A two-wire system may be used according to thhe invention to supply the unit.

Figure 13:
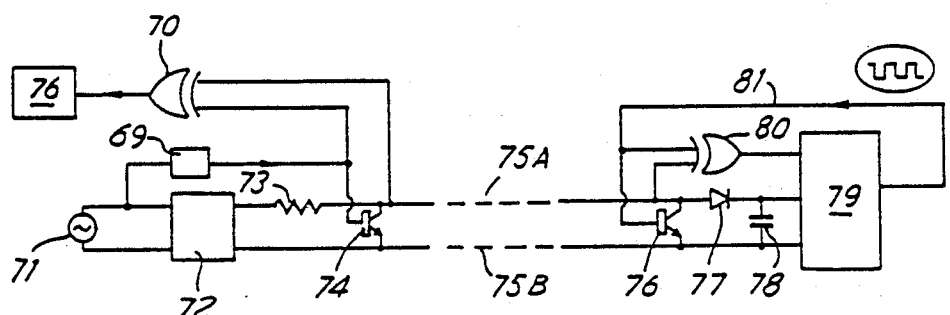
FIG. 13 is a block diagram of the synchronisation circuit for the sensor or detector unit.

The synchronisation circuit is shown more clearly in FIG. 13. As shown an AC supply unit 71 supplies AC power to an AC to DC converter 72. A resistor 73 and the emitter/collector path of a transistor 74 are connected in series across the output of the converter 82. Two flexible wires or cables 75A and 75B connect the emitter/collector path of transistor 74 in parallel with the emitter/collector path of a transistor 76 (mounted on the movable door) and also feed the sensor unit 79 with power through a rectifier and filter provided by a diode 77 and a capacitor 78.

A pulse generator 69 connected to the AC supply 71 supplies pulses synchronous with the mains frequency to the base of the transistor 74.

The output from the sensor unit 79 feeds the base of the transistor 76 and also one input of an exclusive OR gate 80. The other input of the exclusive OR gate 8C is connected to the wire 75A.

The wire 75A is also connected to one input of another exclusive OR gate 70. The other input of the gate 70 is connected to the output of the pulse generator 69. The output of the exclusive OR gate 70 is connected to a remote device 76, for example, for a door controller, and/or to provide further synchronisation signals and control signals e.g. for further units.

In operation the pulses generated by the pulse generator 69 modulate the power supply fed via lines 75A and 75B to the sensor 79 mounted on the movable door. The output of the sensor 79 in turn also modulates the signal on the lines 75A and 75B. The use of the exclusive OR gate 8C renders the sensor 79 insensitive to the modulation which the sensor 79 itself produces on the lines 75A and 75B. The exclusive OR gate 70 inhibits the passage of pulses generated by the pulse generator 69 to the remote device 76.

In this way only a two wire link is required between the door and the door frame thus reducing the problems of fatigue.

In addition to the units shown in FIG. 6 at least one further unit may be provided on the edge 5 such that there is a direct sight between this unit and one of the units on the door. In this way a 'curtain' detection beam extending across the door opening can be produced, which, when broken, can be arranged to give a detection signal. Further the 'curtain' signal may be used to desensitise units as necessary under adverse operating conditions by suitable modification of the arrangement of the units relative to each other.

It will be understood the several sensor units can be combined into an assembly which will then be used as described in connection with a single unit.

Figure 14:
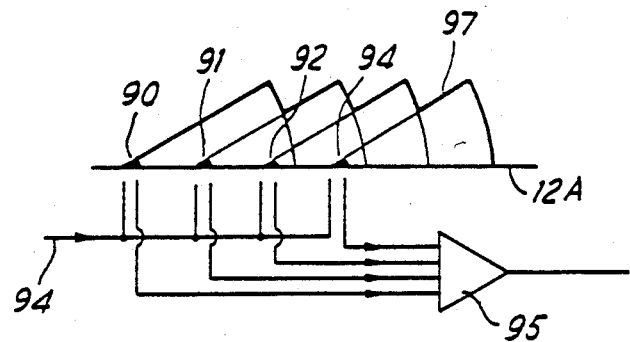
FIG. 14 is a diagram of a multisensor unit.

FIG. 14 shows a multi-element single sensor unit. As shown four sensors 90 to 93 are positioned on the leading edge 12A of a door so that the profiles overlap to such an extent that the combined profile 97 has an extremity which extends generally parallel to the edge 12A. In this way any variation in range of the individual profiles provided by the individual sensors will only have a reduced effect on the width of the combined profile. The transmitters of four sensors 90 to 93 are fed by common line 94 and the receivers are connected to respective inputs of a summing amplifier 95.

It will be appreciated that this multi-element sensor unit can replace the single sensors of any of the embodiments hereinbefore described.

With the embodiments described it will be readily apparent that the manner in which the sensors can be adjusted to cover any shape of detection space renders the system extremely flexible.

Also while the beams produced by individual sensors are normally divergent to provide volumetric sensitivity they can instead be made convergent to provide point sensitivity.

The shape of the transmission and reception profiles of each sensor can be controlled in many different ways for example by collimated or divergent lenses, by reflectors (e.g. parabolic) or by electromagnetic means.

Furthermore instead of beams of energy each sensor may transmit or receive beams of other media for example air jets.

In a modification the barrier 3 between the transmitter 1 and receiver 2 can be omitted where a directional property is inherent in their construction or the control circuits are able to ignore a direct as opposed to a reflected signal.

Experiments with a detector according to the invention were made in which objects were successfully detected up to a distance of 3 meters from the sensor units.

We claim:

1. A proximity detector system comprising a plurality of transmitter/receiver pairs each having a transmitter for transmitting energy in a corresponding predetermined direction and a receiver for receiving said energy after reflection by an object located in said direction, averaging means for receiving an output from each receiver and producing a reference signal equal to an instantaneous average of the outputs of said receivers, comparison means for comparing the output of each receiver and the reference signal and generating a control signal when the difference between any of the output signals from the receiver and the reference signal exceeds a predetermined threshold.

2. A system according to claim 1 wherein said averaging means comprises a summing amplifier.

3. A system according to claim 2 wherein said comparison means comprises a plurality of comparators one for each said transmitter/receiver pair, one input of each comparator being connected to the output of the receiver of a corresponding transmitter/receiver pair and the other output of each comparator being connected to a common output of the averaging means, and an OR gate having a plurality of inputs, each input being connected to the utput of a respective comparator, the said control signal being generated at the output of the OR gate.

4. A system according to claim 1 wherein said comparison means comprises a plurality of comparators one for each said transmitter/receiver pair, one input of each comparator being connected to the output of the receiver of a corresponding transmitter/receiver pair and the other output of each comparator being connected to a common output of the averaging means, and an OR gate having a plurality of inputs, each input being connected to the output of a respective comparator, the said control signal being generated as the output of the OR gate.

* * * * *